March 13, 1951 E. E. SIVACEK 2,544,807
WINDSHIELD WIPER MECHANISM
Filed Oct. 31, 1946 2 Sheets-Sheet 1
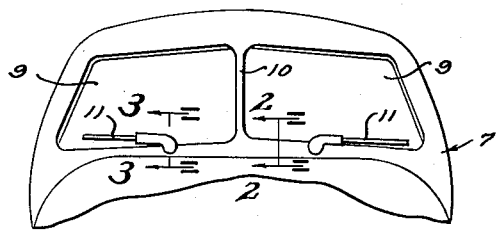
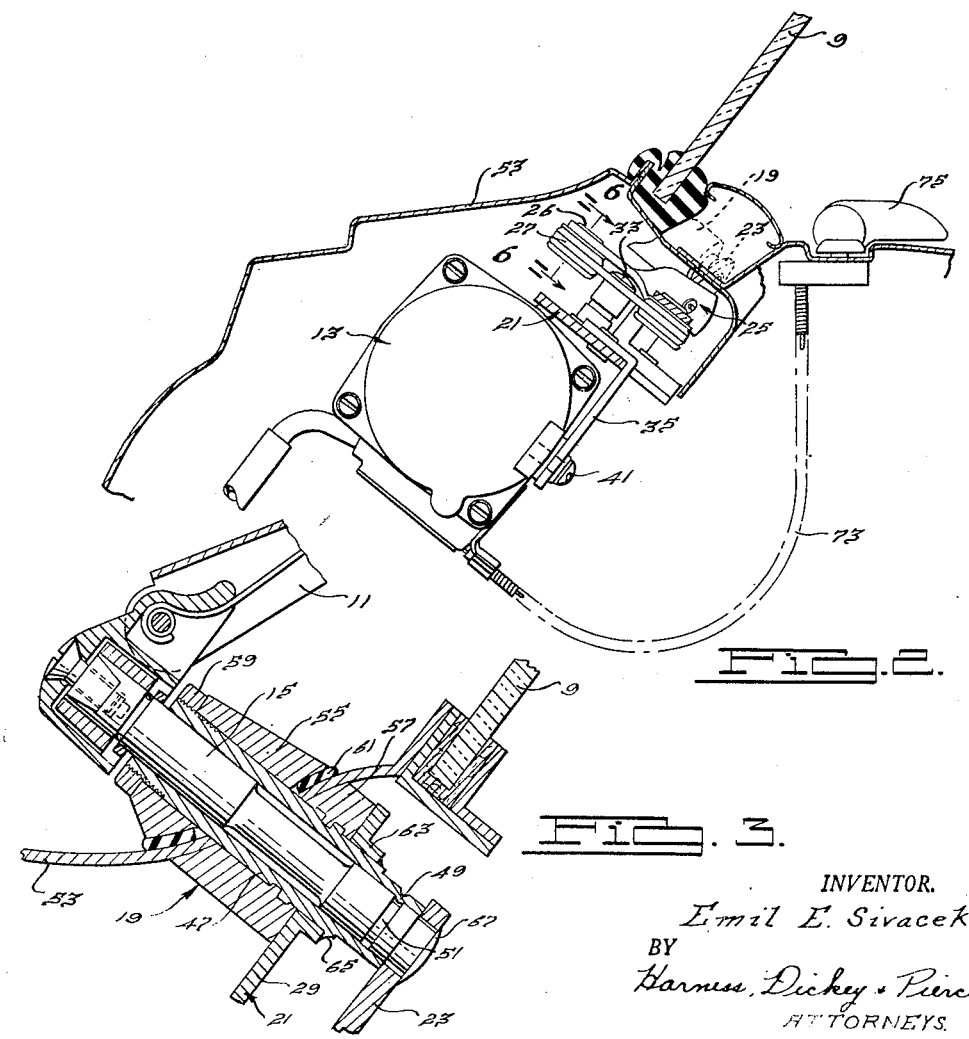
INVENTOR.
Emil E. Sivacek.
BY
Harness, Dickey & Pierce
ATTORNEYS.

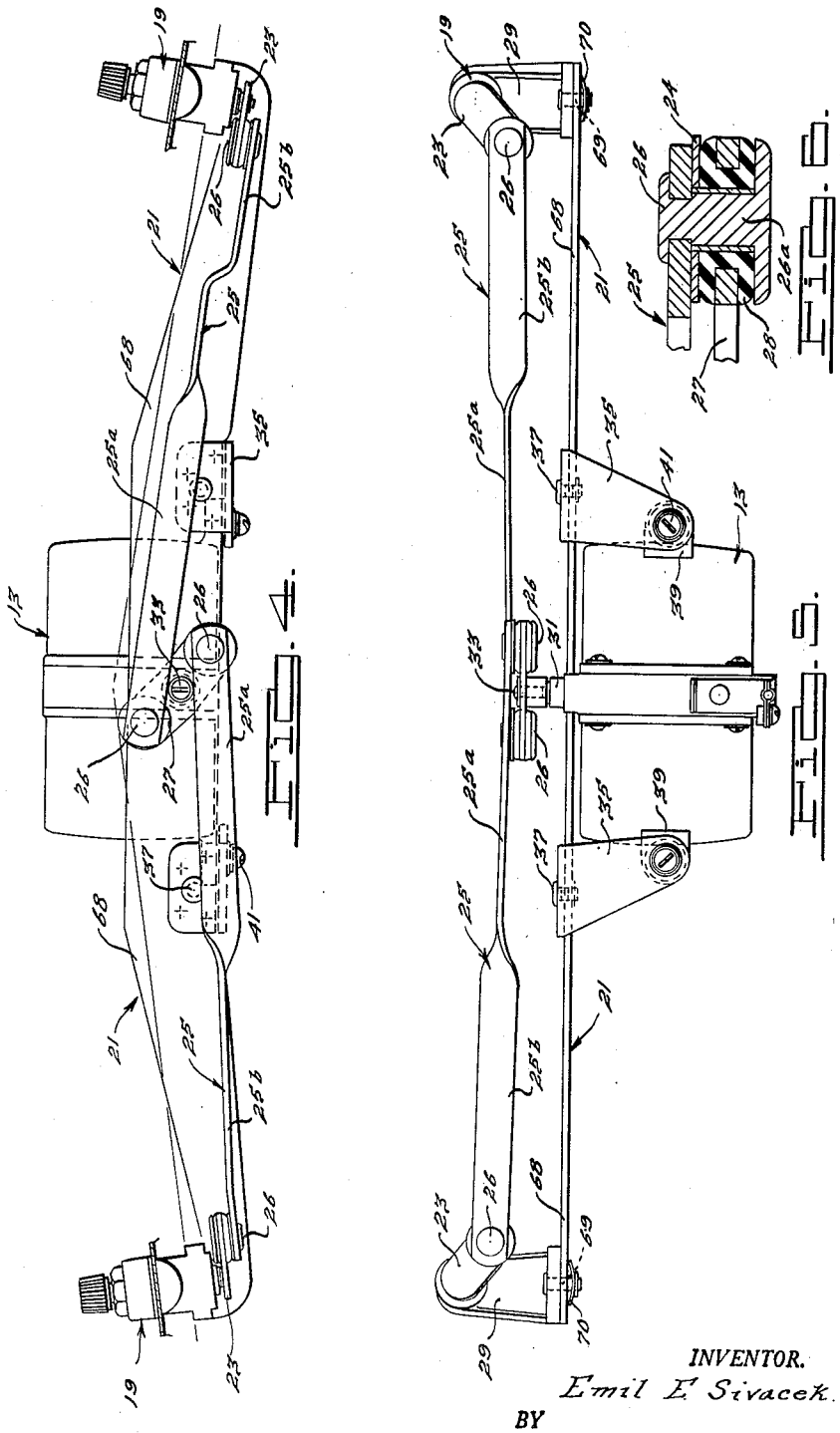

Patented Mar. 13, 1951

2,544,807

UNITED STATES PATENT OFFICE 2,544,807

WINDSHIELD WIPER MECHANISM

Emil E. Sivacek, Ann Arbor, Mich., assignor to King-Seeley Corporation, Ann Arbor, Mich., a corporation of Michigan Application October 31, 1946, Serial No. 706,944

5 Claims. (Cl. 74—96)

The present invention relates to windshield wiper equipment and is particularly directed to the provision of improved driving connections between a wiper driving shaft (which may form part of, or be remote from, an associated wiper motor) and one or more wiper carrying shafts.

It has been conventional in automotive windshield wiper practice, to provide the windshields with a pair of laterally spaced windshield wipers, and to provide a source of power, which is common to both wipers, for oscillating them through predetermined arcuate paths. Usually, the shafts of both wipers are positioned adjacent the lower edge of the windshield and all or part of the mechanism for oscillating the wiper shafts is, consequently, located beneath the cowl, in the space between the instrument panel and the usual fire wall which separates the engine compartment of the automobile from the passenger compartment. The primary motive means for the wipers may, of course, take many different forms, such, for example, as suction operated motors, electric motors, hydraulic motors, and mechanically driven arrangements. Moreover, the primary motive means may be located either beneath the cowl, as aforesaid, or may be located in, for example, the engine compartment. In either event, the mechanism beneath the cowl usually comprises fundamentally a pair of wiper shafts located at spaced points on either side of the longitudinal axis of the vehicle and a driving shaft which is located at or near the longitudinal center line of the vehicle. In case the primary motive means is mounted beneath the cowl, the just-mentioned driving shaft usually forms a part of the primary motive means and may constitute, for example, the oscillatory output shaft of a suction operated wiper motor.

Present day automobiles incorporate a variety of different accessories, in addition to the windshield wiper equipment, which are also mounted beneath the cowl in the above-mentioned space between the instrument panel and the fire wall. These additional accessories may include, for example, radios, cowl ventilator assemblies, including the operating handles therefor, and the like. It will be appreciated that these various cowl mounted accessories produce a considerable amount of congestion beneath the cowl and an increasing amount of difficulty has been experienced in the trade in designing the operating and supporting mechanism for the windshield wiper elements so as to permit them to be located in this congested space without interfering with the other accessories.

In virtually all windshield wiper installations, the two windshield wiper shafts are disposed with their axes in a common plane, which plane intersects the windshield at a right angle. In single section, straight, windshields, the axes of the two wiper shafts may lie parallel with each other, but spaced apart, in the just-mentioned common plane. In the familiar two-section or V type windshield on the other hand, as well as in connection with curved windshields, the axes of the two wiper shafts, though lying in the same above-mentioned common plane, are not parallel to each other, since these axes are normal to the portions of the windshield glass with which the corresponding wiper is associated. In accordance with previous practice, the windshield wiper mounting problem has been considerably complicated by the fact that it has heretofore been necessary to allow sufficient space beneath the cowl to permit the common driving shaft for the wipers to lie in a plane which, though probably spaced above or below the aforesaid common plane, lies parallel to such common plane. This restriction is particularly troublesome in those cases where the primary motive means or wiper motor, is also mounted beneath the cowl, since it limits the possible positions of the motor to those in which its outwardly projecting output shaft lies in a particular plane.

The improvements of the present invention have the distinct advantage that they permit the driving shaft for the wipers to be disposed at any desired degree of angularity to the aforementioned plane. This permits the wiper motor to be disposed in any of a wide variety of positions beneath the cowl while at the same time its output shaft is maintained in a position in which the direction of its axis bisects the angle between the two wiper shafts.

With the foregoing considerations in view, the principal object of the present invention is to provide operating mechanism for a plurality of laterally spaced wiper shafts which may be principally characterized in that a driving shaft common thereto may be disposed at any of a plurality of angular relationships to the common plane which includes the two wiper shafts, and further comprising improved connecting elements between the driving shaft and the wiper shafts, which permit the just-mentioned angular displacement.

Other and more detailed objects of the invention appear in the following description and in the appended claims.

With the above as well as other and in certain cases more detailed objects in view which appear in the following description and in the appended claims, a preferred but illustrative embodiment of the invention is shown in the accompanying drawings throughout the several views of which corresponding reference characters are used to designate corresponding parts, and in which:

Figure 1 is a fragmentary view in front elevation of a vehicle embodying a dual windshield wiper system of the present invention;

Figure 2 is a view in transverse, vertical section taken along the line 2—2 of Figure 1;

Figure 3 is a view in transverse, vertical section taken along the line 3—3 of Figure 1;

Figure 4 is a plan view of the structure shown in Figure 2;

Figure 5 is a view in rear elevation of a portion of the windshield wiper system as shown in Figure 4; and, Figure 6 is a fragmentary view in section, taken along the line 6—6 of Figure 2.

It will be appreciated from a complete understanding of the present invention that in a generic sense the improvements thereof may be embodied in windshield wipers of various different designs arranged for use in connection with various different vehicles. A preferred and illustrated application of the invention is in connection with the so-called cowl-mounted dual wiper system.

Referring to the drawings, the illustrative vehicle 7 which is provided with a usual rearwardly inclined V type windshield, comprising glass sections 9, is provided with a windshield wiper system comprising generally a pair of identical wipers 11 which are adapted to be oscillated through arcs, of similar size and location with respect to associated glass sections, by means of a driving motor 13. In their normal or parked position as shown in Figure 1, the two wipers 11 lie in a substantially horizontal position immediately adjacent the lower margin of the associated glass sections.

Each wiper 11 is releasably connected as described below to an oscillatory wiper shaft 15, the two shafts 15 being supported in predetermined relation to each other and to the cowl 17 of the vehicle 7 by means of swivels 19 and a unitary interconnecting bracket 21, which may and preferably does embody certain of the features disclosed and claimed in applicant's copending application, Serial No. 628,159, filed November 13, 1945. It likewise will be noted that both of the shafts 15 are normal to their associated glass sections and, though they are not parallel to each other, they lie in a common plane which intersects the glass sections at a right angle. Each wiper shaft 15 carries a crank 23 which is pivotally connected by means of an associated link 25 to the corresponding end of a crank 27 which is releasably secured, as by a stud 33, to the outer end of the output or drive shaft 31 of the wiper motor 13. In the present system, it is of course, desirable that the drive shaft 31 be disposed in a plane which includes an imaginary line which bisects the angle between the two wiper shafts. This equalizes the lateral spacing between the drive shaft and the two wiper shafts and simplifies the problem of equalizing the arcs of movement of the wiper shafts. On the other hand, in view of the present improvements, the angular position of the drive shaft, in said bisecting plane, is immaterial. Consequently, and as shown, the motor 13 may be conveniently mounted with its shaft 31 extending substantially parallel to the center post 10 which separates the two glass sections 9. This disposition of the motor 13 brings the body thereof well up under the cowl 53 and positions all the operating cranks above the motor and in a relatively out-of-the-way position immediately below the lower edge of the glass.

Continuing with the details of the present assembly, the above-mentioned displacement between the axis of the drive shaft 31 and the common plane of the wiper shafts 15 is made possible by twisting the cranks 25 so that their ends are angularly displaced from each other by a sufficient angle (in this case approximately 90 degrees) to permit such ends to be pivotally connected to the pins 26 which pivotally interconnect the links 25 to the cranks 23 and 27. Thus, the end portions 25a of the cranks are substantially normal to the axis of drive shaft 31 and the end portions 25b are substantially normal to the pins 26 and the wiper shafts 15. As will be recognized, oscillatory movements of shaft 31 are transmitted through links 25 and cranks 23 and cause corresponding but opposite oscillatory movements of wiper shafts 15 and of wipers 11.

It will be appreciated that the above twisting of the cranks permits any desired angle of displacement between the axis of the drive shaft 31 and the common plane of the wiper shafts 15. In the claims, the term "substantial angle" is used to refer to any angle, either large or small, which is designed into the apparatus, to meet the particular assembly conditions which are met with in the practice.

It will be appreciated that since the wiper shafts 15 are not parallel to each other and are not parallel to the driving shaft 31, the oscillatory movements of cranks 27 and 23 cause some rocking movements between these cranks, respectively, and the corresponding ends of the links 25. To accommodate these comparatively slight rocking movements, it is preferred to arrange the link and crank connections, comprising the previously mentioned pins 26, in the manner shown in Figure 6. Referring to this figure, each outer end of the crank 27 carries a rubber grommet 28, the central aperture of which receives the bushing 26 carried by the central body portion 26a of the pin 26. The corresponding end of the link 25 is held in place between the headed end of the pin 26 and a washer 24 which abuts the corresponding face of the grommet 28. The grommet 28 in turn is held in place between the just-mentioned washer and the other headed end of the pin 26. The just-mentioned connection, in addition to being very quiet and free in its operation, readily accommodates the above-mentioned rocking movements between the ends of the cranks and the corresponding ends of the links 25. It will be appreciated, of course, that all of these link to crank connections are preferably arranged as described in connection with Figure 6.

The wiper motor 13 may be of any desired type but by way of illustration it is illustrated as being of the double-piston, suction operated, type, certain features whereof are described and claimed in Bell Patent No. 2,354,189, granted July 25, 1944, and in the copending application of the present applicant, Serial No. 610,557, filed August 13, 1945. As shown the motor 13 is secured to the unitary bracket 21 by means of a pair of L-shaped mounting brackets 35 which are individually riveted, or otherwise secured, to the unitary bracket as at 37. The leg of each bracket 35 is connected, by a stud 41, to an associated ear 39 provided therefor on the body of the motor 13. The starting and stopping of motor 13 may, of course, be controlled by knob 75, which is connected to motor 13 by cable 73; and it will be understood that when knob 75 is operated to stop the wipers, motor 13 automatically acts to bring the wipers to rest in the parked position shown in Figure 1.

As shown, each swivel 19 comprises a sleeve 47 within which the associated shaft 15 is rotatable, relative axial movement between the two being prevented as shown by one or more tongues 49 which are depressed inwardly from the surface of the sleeve 47 and are received in an annular groove 51 provided therefor in the shaft 15. The assembly comprising sleeve 47 and shaft 15 is secured in place relative to the associated cowl 53 by means of a housing formed of inner and outer end preferably die cast sections 55 and 57. Section 57 may be and preferably is cast with the sleeve 47 and shaft 15 in place so as to fix a relative position thereof. Section 55 is removable from the sleeve 47 and is held in place thereon by a nut 59. A gasket 61 may be and preferably is interposed between the housing section 55 and the cowl 53 it being appreciated that the cowl is apertured to accommodate the passage of sleeve 47 therethrough and that the juxtaposed faces of the housing sections 55 and 57 are complemental and are shaped to conform to the curvature of the cowl.

The assembly comprising the housing section 57 and the sleeve 47 are rigidly secured to the previously mentioned upwardly extending end portion 29 of the main supporting bracket 21. More particularly, as shown, each portion 29 is provided with a neck 63 which receives the sleeve 47. The face of each bracket portion 29 abuts the inner end of the housing section 57 and the assembly operation is completed by rings taking the sleeve as indicated at 65.

The inner end of each shaft 15 is provided with a flattened section which is received in a non-circular opening in the corresponding crank 23, the connection being completed by peening over the end of the shaft 15 as indicated at 67.

The end portions 29 are provided with turned ends, by which they are connected to the ends of the body portion 68 of the bracket 21. To facilitate the insertion of the shafts 15 through the cowl openings during the assembly of the wiper equipment with the vehicle, at least one portion 29 is preferably pivotally connected, as by a rivet 69, and a dished spring 70, to the corresponding end of bracket 21. As shown, the other end portion 29 is fixed to bracket 21 by its rivet 69.

As shown, the swivels 19 afford the sole supporting connection between the vehicle and the wiper assembly, motor 13 being entirely supported by the central portion of the bracket 21. Thus assembly of the wiper equipment with the vehicle involves only the steps of passing the shafts 15 through the cowl openings and thereafter applying the external elements 55—59—61 of the swivels.

It is to be particularly noted that the above described cowl assembly inherently locates the two swivel shafts 15 in properly spaced location with respect to each other and in respect to the cross arm 27. Accordingly, since the links 25 and crank 23 are correspondingly dimensioned the two swivel shafts 19 are automatically caused to assume corresponding rotative positions with respect to each other. It is within the purview of the invention to include an adjustment between the cross arm 27 and the wipers 11 as by making one or both of links 25 of adjustable length but the use of the unitary bracket 21 ordinarily makes such adjustment unnecessary. As shown, the connections between the wipers 11 and the shafts 15 are such as to predetermine the relative rotative positions of these elements, the positions, on the windshield, of the arcs of movement of the wipers, being determined entirely by the relative lengths of cranks 23 and 27. Alternatively, of course, the connections between the wipers 11 and the shafts 15 may be arranged to permit relative rotative adjustment between these elements, one satisfactory structure for accomplishing this purpose being described and claimed in applicant's copending application, Serial No. 628,159, filed November 13, 1945.

Although only a single specific embodiment of the invention has been described in detail, it will be appreciated that various modifications in the form, number, and arrangement of the parts may be made without departing from the spirit and scope of the invention.

I claim:

1. In a vehicle windshield wiper system, a pair of wiper shafts adapted to be rockably mounted in laterally spaced relation adjacent the windshield of the vehicle, a drive shaft adapted to be rockably mounted within the vehicle between the wiper shafts, means adapted to support the wiper shafts with their axes lying in a common plane, the axis of the drive shaft being so disposed that it or any extension thereof intersects said plane at a substantial angle, and transmission means connecting said drive shaft and said wiper shafts so that rocking movements of the drive shaft are communicated to and cause corresponding rocking movements of said wiper shafts, said transmission means comprising a crank carried by and individual to each of said wiper shafts, crank means carried by said drive shaft, and a link forming a connection between each said crank and said crank means, each said link comprising a flat strip having connecting means adjacent its ends for connection, respectively, to the corresponding said crank and said crank means and said link being twisted, intermediate said connecting means, through an angle corresponding to the angle of intersection of the axis of said drive shaft with said common plane.

2. In a vehicle windshield wiper system, a pair of wiper shafts adapted to be rockably mounted in laterally spaced relation adjacent the windshield of the vehicle and disposed with extensions of their axes intersecting at a fixed angle, a drive shaft adapted to be rockably mounted within the vehicle between the wiper shafts, a unitary mounting bracket supporting said wiper shafts with their axes lying in a common plane and supporting said drive shaft with its axis in a plane bisecting the angle between said wiper shafts and intersecting said common plane at a substantial angle, and transmission means connecting said drive shaft and said wiper shafts so that rocking movements of the drive shaft are communicated to and cause corresponding rocking movements of said wiper shafts, said transmission means comprising a crank carried by and individual to each of said wiper shafts, crank means carried by said drive shaft, and a link forming a connection between each said crank and said crank means, each said link comprising a flat strip having connecting means adjacent its ends for pivotal connection, respectively, to the corresponding said crank and said crank means and said link being twisted, intermediate said connecting means, through an angle corresponding to the angle of intersection of the axis of said drive shaft with said common plane.

3. In a vehicle windshield wiper system, a pair of wiper shafts adapted to be rockably mounted in laterally spaced relation adjacent the windshield of the vehicle and disposed with extensions of their axes intersecting at a fixed angle, a drive shaft adapted to be rockably mounted within the vehicle between the wiper shafts, a unitary mounting bracket supporting said wiper shafts with their axes lying in a common plane and supporting said drive shaft with its axis in a plane bisecting the angle between said wiper shafts and intersecting said common plane at a substantial angle, and transmission means connecting said drive shaft and said wiper shafts so that rocking movements of the drive shaft are communicated to and cause corresponding rocking movements of said wiper shafts, said transmission means comprising a crank carried by and individual to each of said wiper shafts, crank means carried by said drive shaft, and a link having connecting means at each end thereof and forming a connection between each said crank and said crank means, the connecting means at the ends of each link being rotated relative to each other through an angle corresponding to said substantial angle and being adapted to accommodate the rocking between the ends of the links and the cranks and crank means which results from the fact that the plane in which each crank travels is disposed at an angle to the plane in which the crank means travels.

4. In a vehicle windshield wiper system, a pair of wiper shafts adapted to be rockably mounted in laterally spaced relation adjacent the windshield of the vehicle and disposed with extensions of their axes intersecting at a fixed angle, a drive shaft adapted to be rockably mounted within the vehicle between the wiper shafts, a unitary mounting bracket supporting said wiper shafts with their axes lying in a common plane and supporting said drive shaft with its axis in a plane bisecting the angle between said wiper shafts and intersecting said common plane at a substantial angle, and transmission means connecting said drive shaft and said wiper shafts so that rocking movements of the drive shaft are communicated to and cause corresponding rocking movements of said wiper shafts, said transmission means comprising a crank carried by and individual to each of said wiper shafts, crank means carried by said drive shaft, and a link having connecting means at each end thereof and forming a connection between each said crank and said crank means, the connecting means at the ends of each link being rotated relative to each other through an angle corresponding to said substantial angle and being adapted to accommodate the rocking between the ends of the links and the cranks and crank means which results from the fact that the plane in which each crank travels is disposed at an angle to the plane in which the crank means travels, each of said connecting means including a pin fixed to the link and a resilient grommet mounted in an aperture in the associated crank and crank means and rotatably mounted on said pin.

5. In a vehicle wiper system, the combination of a pair of wiper shafts adapted to be rockably mounted in laterally spaced relation adjacent the windshield of the vehicle and disposed with extensions of their axes intersecting at a fixed angle, a drive means having a drive shaft rockably mounted within the vehicle between the wiper shafts, a unitary mounting bracket supporting said wiper shafts with their axes in a common plane and supporting said drive shaft with its axis in a plane bisecting the angle between said wiper shafts and intersecting said common plane at a substantial angle, and transmission means comprising a pair of cranks fastened to said wiper shafts, a drive crank detachably fastened to said drive shaft, and a pair of links connecting said pair of cranks to said drive crank, said drive means being detachable from said unitary mounting bracket without affecting said transmission means.

EMIL E. SIVACEK.

REFERENCES CITED

The following references are of record in the file of this patent:

UNITED STATES PATENTS

| Number | Name | Date |
|---|---|---|
| 134,117 | Wheeler | Dec. 17, 1872 |
| 206,184 | Little | July 23, 1878 |
| 502,851 | Dixon et al. | Aug. 8, 1893 |
| 515,058 | Rosson et al. | Feb. 20, 1894 |
| 1,354,470 | Dickinson | Oct. 5, 1920 |
| 1,839,175 | Hueber | Dec. 29, 1931 |
| 1,875,896 | Smulski | Sept. 6, 1932 |
| 2,006,320 | Hueber | June 25, 1935 |
| 2,252,350 | Paulus | Aug. 12, 1941 |

FOREIGN PATENTS

| Number | Country | Date |
|---|---|---|
| 61,504 | Switzerland | Sept. 20, 1912 |
| 639,786 | France | June 29, 1928 |